G. H. NUSS AND C. F. HECKEL.
I. R. NUSS, EXECUTRIX OF G. H. NUSS, DEC'D.
TRAY FILLING AND LEVELING MECHANISM.
APPLICATION FILED JULY 19, 1920.

1,405,068.

Patented Jan. 31, 1922.
2 SHEETS—SHEET 1.

INVENTORS
George H. Nuss
Charles F. Heckel
By James N. Ramsey
ATTORNEY

G. H. NUSS AND C. F. HECKEL.
I. R. NUSS, EXECUTRIX OF G. H. NUSS, DEC'D.
TRAY FILLING AND LEVELING MECHANISM.
APPLICATION FILED JULY 19, 1920.

1,405,068.

Patented Jan. 31, 1922.
2 SHEETS—SHEET 2.

INVENTORS
George H. Nuss
Charles F. Heckle
BY
James N. Ramsey
ATTORNEY

007
UNITED STATES PATENT OFFICE.

GEORGE H. NUSS, OF CINCINNATI, OHIO, AND CHARLES F. HECKEL, OF NEWPORT, KENTUCKY; ISABEL R. NUSS EXECUTRIX OF SAID GEORGE H. NUSS, DECEASED.

TRAY FILLING AND LEVELING MECHANISM.

1,405,068. Specification of Letters Patent. Patented Jan. 31, 1922.

Application filed July 19, 1920. Serial No. 397,561.

*To all whom it may concern:*

Be it known that we, GEORGE H. NUSS and CHARLES F. HECKEL, citizens of the United States, and residents, respectively, of Cincinnati, in the county of Hamilton and State of Ohio, and of Newport, in the county of Campbell and State of Kentucky, have invented certain new and useful Improvements in Tray Filling and Leveling Mechanism, of which the following is a specification.

Our invention relates to mechanisms which are particularly adapted to fill the trays which are used in the making of certain mold shaped candies and which trays are filled with starch in which the candy shapes are impressed before the molding operation takes place.

Heretofore in the filling of trays with starch or other finely divided material in which the candies are molded, the corners of the tray have been left vacant or the starch filled therein in unevenly compacted areas.

An object of our invention is therefore to produce a mechanism which will operate to fill trays with any powdered or otherwise finely divided material, in a manner such that the filling will be compact and uniform, with no vacant or unfilled portions left therein.

This and other objects are attained in the filling and leveling mechanism described in the following specification and illustrated in the accompanying drawings in which.

Figure 1:
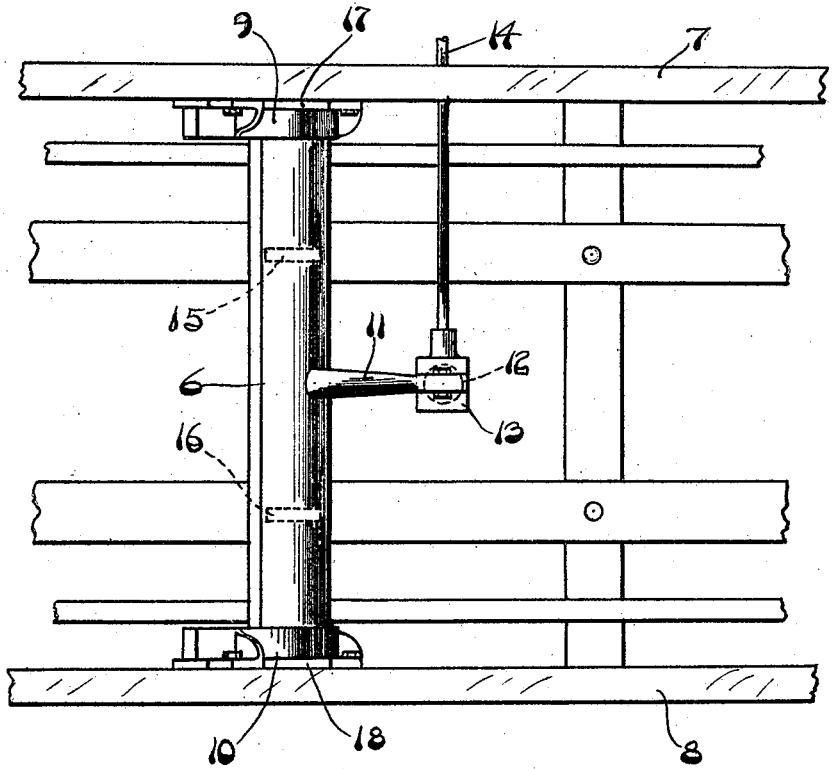
Fig. 1 is a fragmental plan view of a filling and leveling mechanism embodying our invention, mounted within a tray conveyor trough within which are tracks for carrying the trays.

In our device a curved plate 6 is provided; this plate being mounted for transverse reciprocataion with relation to the trough sides 7 and 8 and within curved guide brackets 9 and 10 attached to the respective sides. An arm 11 is attached to the back of the plate 6 and extends rearwardly for attachment by means of a ball 12 to a socket 13 at the end of a rod 14 which is reciprocated for operating the filler and leveler. On the front side of plate 6 a pair of wings 15 and 16 are provided, the lower edges of the wings being curved as shown. The brackets 9 and 10 are open at their sides next to the sides of the trough so as to provide spaces 17 and 18. This prevents the accumulation of the starch or other material upon which the filler and leveler is operating, within the brackets so that the plate is free to reciprocate without packing and clogging its movement.

Figure 2:
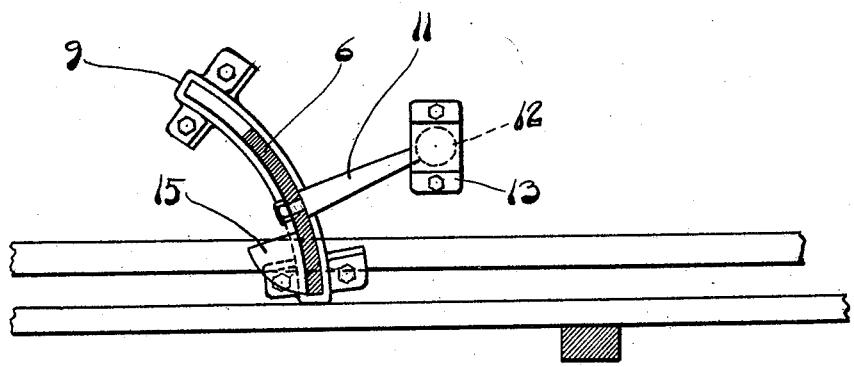
Fig. 2 is a longitudinal section of the mechanism shown in Fig. 1, without the enclosing trough, but showing the cooperation of the leveler with the tracks upon which the trays slide in their passage through the trough, the filler and leveler being shown in inoperative position.
Figure 3:
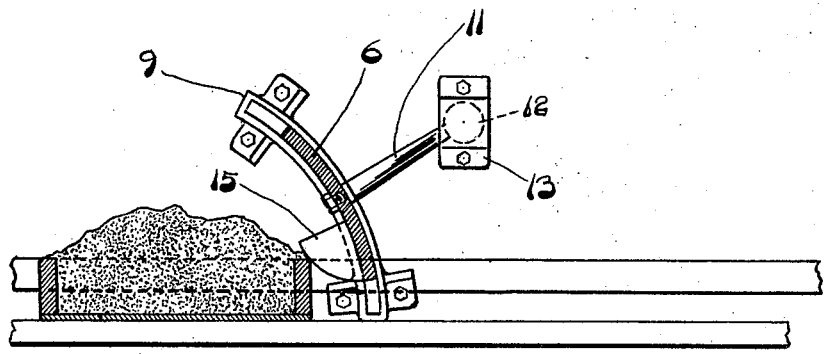
Fig. 3 is a view similar to Fig. 2, but showing the position assumed by the filler and leveler upon engagement therewith of a tray which has been heaped with material ready for the leveling and corner filling operation of our mechanism.

In the operation of our invention, the filler and leveler plate 6 is in the position shown in Fig. 2, resting on the bottoms of the brackets. A tray, which has been heaped with the material to be leveled, is then presented to the filler and leveler while the plate is being reciprocated. As the tray is pushed over the tracks, the wings 15 and 16 are engaged by the forward edge of the tray, causing the plate to lift because of the curved formation of the lower edges of the wings, as shown in Fig. 2.

Figure 4:
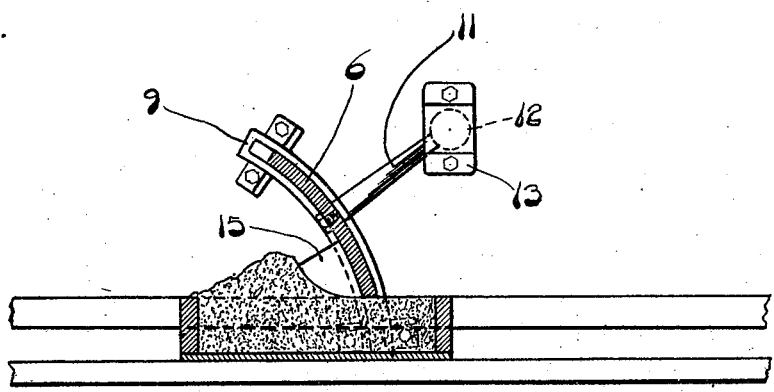
Fig. 4 is a view similar to Fig. 3, showing the mechanism in its filling and leveling operation.
Figure 5:
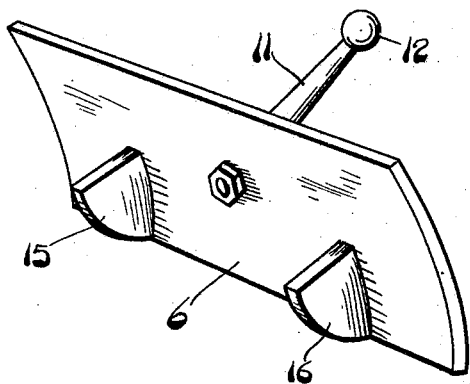
Fig. 5 is a perspective view of the filler and leveler embodying our invention.

This results in the plate being lifted to ride on top of the tray as its movement over the tracks is continued, as shown in Fig. 4. In this movement of the tray the reciprocation of the plate causes its wings 15 and 16 to push the material into the unfilled corners and sides of the tray, thus performing the filling operation. At the same time, as the tray is passed beneath the plate, all surplus material is scraped off level as the finished portion shows in Fig. 4. Thus when the tray has completed its passage beneath the plate, its entire surface has been scraped level and the edges and corners thereof filled in. After having passed from beneath the tray the plate will automatically drop to the bottoms of its mounting brackets in position to repeat its operation upon presentation thereto of another tray. In case the trays are being passed along the tracks rapidly, they will push each other and the plate will ride over the continuous surface formed by the abutting tops of the trays.

It will thus be seen that in our invention there is accomplished the uniform filling and leveling of each tray without having any interstices or vacant places and without having any unevenly compacted portions of the material within the tray.

The trays for use in starch-bucks are of varying heights and these trays of varying heights are used indiscriminately. The heels or supports of the trays wear or chip off so that one side of the tray is often higher than the other.

An advantage of our invention is that the curved wings 15 and 16 will automatically ride up onto the starch trays of varying heights, and another advantage is that the leveler will automatically adapt itself to the varying irregularities of surface of the tray, as for instance, if one side of the tray should be higher than the other the leveler will automatically adapt itself to the tray and level the starch just the same as if the tray passed beneath the leveler in a perfectly horizontal position.

Having thus described our invention what we claim is:

1. A tray filling and leveling mechanism comprising a plate having a plurality of wings thereon, means mounting the plate for automatic movement substantially vertical and transverse either simultaneously or successively with relation to a tray passing beneath it, said wings having a curved edge for lifting the leveler upon engagement of a filled tray therewith, and means adapted to vibrate the leveler transversely of the tray, whereby the wing will push the heaped material in the tray into the corners and edges thereof and whereby the plate will scrape the excess material from the surface of the tray.

2. A tray filling and leveling mechanism comprising a plate having a plurality of wings thereon, automatic means mounting the plate for substantially vertical and transverse movement either simultaneously or separately with relation to a tray passing beneath it, and means adapted to vibrate the leveler transversely of the tray, whereby the wings will push the heaped material in the tray into the corners and edges thereof and whereby the surplus material will be scraped from the surface of the tray by the plate.

3. A tray filling and leveling mechanism comprising a plate, automatic means mounting the plate for substantial vertical and transverse movement either simultaneously or separately with relation to a tray passing beneath it, and means adapted to vibrate the plate transversely of the tray for pushing the material into unoccupied spaces and for scraping surplus material from the surface of the tray.

4. A tray filling and leveling mechanism comprising a vertically disposed, transversely curved plate, a vertically disposed wing on the front side of said plate near the end thereof and having its lower surface on a level with the lower end of said plate and curved forwardly and upwardly therefrom, and means adapted to vibrate said plate transversely of the tray for spreading the material into unoccupied spaces, and for scraping surplus material from the surface of the tray whereby said leveler is adapted to automatically move both laterally and vertically, substantially as set forth and for the purposes specified.

GEORGE H. NUSS.
CHARLES F. HECKEL.